United States Patent
Dazzi et al.

(10) Patent No.: US 11,215,637 B2
(45) Date of Patent: Jan. 4, 2022

(54) METHOD AND APPARATUS OF ATOMIC FORCE MICROSCOPE BASED INFRARED SPECTROSCOPY WITH CONTROLLED PROBING DEPTH

(71) Applicant: Bruker Nano, Inc., Santa Barbara, CA (US)

(72) Inventors: Alexandre Dazzi, Orsay (FR); Anirban Roy, Santa Barbara, CA (US); Honghua Yang, Seattle, WA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 16/940,996

(22) Filed: Jul. 28, 2020

(65) Prior Publication Data
US 2021/0011053 A1    Jan. 14, 2021

Related U.S. Application Data

(63) Continuation-in-part of application No. PCT/EP2019/073600, filed on Sep. 4, 2019.

(30) Foreign Application Priority Data

Sep. 6, 2018 (FR) .................................. 1858000
Oct. 19, 2018 (FR) .................................. 1859683

(51) Int. Cl.
*G01Q 60/34* (2010.01)
*G01Q 60/38* (2010.01)
*G01N 21/35* (2014.01)

(52) U.S. Cl.
CPC ............ *G01Q 60/34* (2013.01); *G01Q 60/38* (2013.01); *G01N 21/35* (2013.01)

(58) Field of Classification Search
CPC ...................................................... G01Q 60/00
See application file for complete search history.

(56) References Cited

U.S. PATENT DOCUMENTS

| | | | | |
|---|---|---|---|---|
| 2006/0222047 A1* | 10/2006 | Reading | ................ | G01Q 30/02 374/120 |
| 2012/0204296 A1* | 8/2012 | Prater | ................... | B82Y 35/00 850/6 |

(Continued)

FOREIGN PATENT DOCUMENTS

WO    2018039255    3/2018

OTHER PUBLICATIONS

Le Wang et al., "Nanoscale Simultaneous Chemical and Mechanical Imaging via Peak Force Infrared Microscopy", Science Advances, vol. 3, No. 6, Jun. 23, 2017.

(Continued)

*Primary Examiner* — Eliza W Osenbaugh-Stewart
(74) *Attorney, Agent, or Firm* — Boyle Fredrickson S.C.

(57) ABSTRACT

A method for obtaining optical spectroscopic information about a sub-micron region of a sample with quantitatively controlled depth/volume of the sample subsurface using a scanning probe microscope. With controlled probing depth/volume, the method can separate top surface data from subsurface optical/chemical information. The method can also be applied in liquid suitable for studying biological and chemical samples in their native aqueous environments, as opposed to air. In the method, a depth-controlled spectrum of the surface layer is constructed by illuminating the sample with a beam of infrared radiation and measuring a probe response using at least one of the resonant frequencies of the probe. The surface sensitivity is obtained by limiting the heat diffusion effect of the subsurface so as to confine the signal. The signal confinement is achieved through non- (Continued)

linearity of the acoustic wave with probe, as well as benefits gained by a high modulation frequency of the infrared radiation source at >1 MHz.

26 Claims, 13 Drawing Sheets

(56) References Cited

U.S. PATENT DOCUMENTS

| | | | |
|---|---|---|---|
| 2013/0036521 A1* | 2/2013 | Prater | G01Q 60/32 |
| | | | 850/56 |
| 2013/0283487 A1 | 10/2013 | Wickramasinghe et al. | |
| 2018/0217181 A1* | 8/2018 | Friedman | G01Q 60/30 |

OTHER PUBLICATIONS

Tomoda et al., "Local Probing of Thermal Properties at Submicron Depths with Megahertz Photothermal Vibrations", Applied Physics Letters, A I P Publishing LLC, vol. 82, No. 4, Jan. 27, 2003.

Jin et al. "High-Sensitivity Infrared Vibrational Nanospectroscopy in Water", Light: Science & Applications (2017) 6, published Jul. 28, 2017.

O'Callahan et al., "In Liquid infrared Scattering Scanning Near-Field Optical Microscopy for Chemical and Biological Nano-Imaging" Nano Letters, May 1, 2020.

* cited by examiner

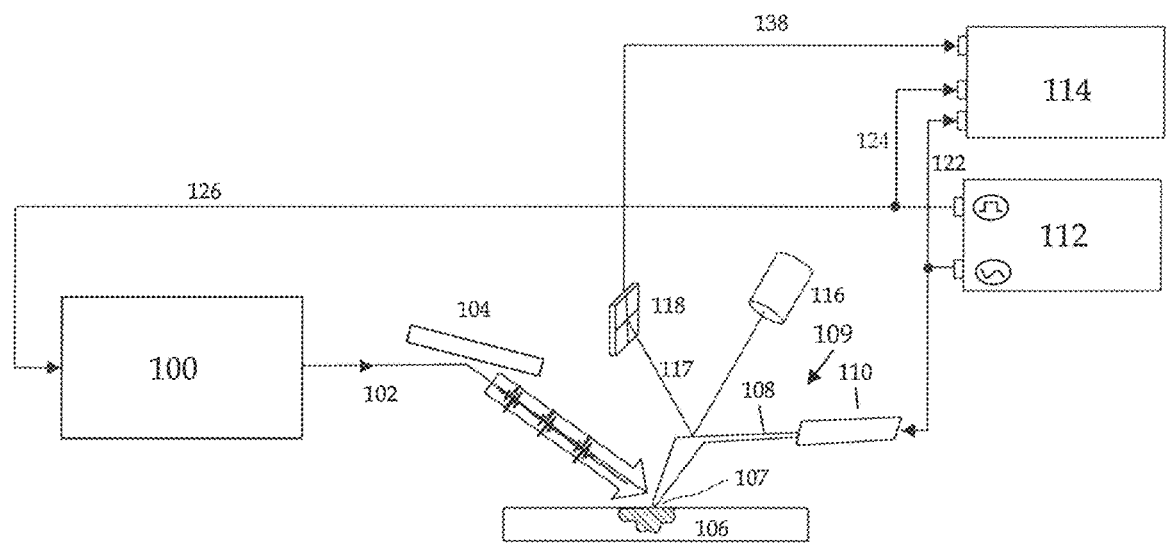
Fig. 2A
Fig. 2B
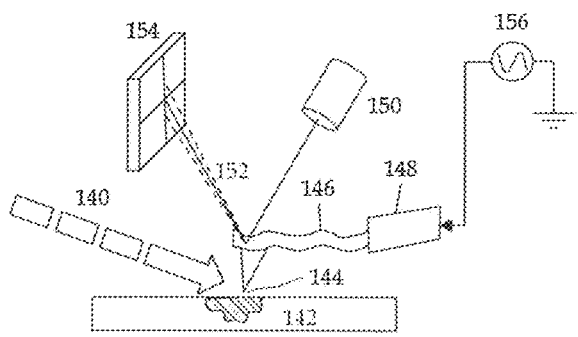

Fig. 10A — Beer-Lambert's Law

Fig. 10B — Stokes's Law

Fig. 11A    Fig. 11B
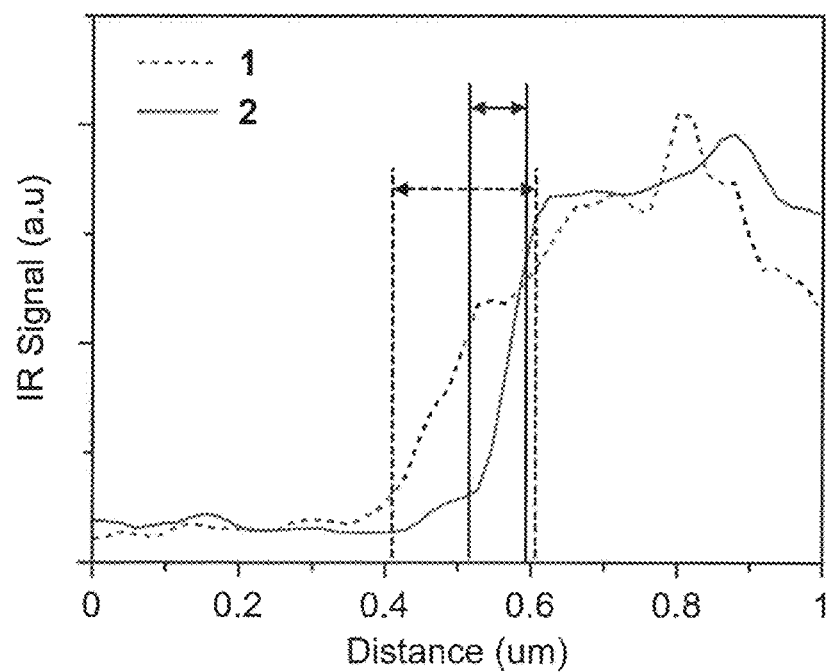
Fig. 11C

METHOD AND APPARATUS OF ATOMIC FORCE MICROSCOPE BASED INFRARED SPECTROSCOPY WITH CONTROLLED PROBING DEPTH

CROSS-REFERENCE TO RELATED APPLICATIONS

This application is a Continuation-in-Part of PCT Application No. PCT/EP2019/073600, filed Sep. 4, 2019, and entitled "System for Measuring the Absorption of a Laser Emission by a Sample," the subject matter of which is hereby incorporated by reference in its entirety.

BACKGROUND OF THE INVENTION

Field of the Invention

The preferred embodiments are directed to making nano-optical and spectroscopy measurements, and more particularly, relate to using AFM-IR for acquiring information indicative of the distribution of chemical components, preferably in heterogenous systems.

Description of Related Art

AFM-IR is a useful technique for measuring and mapping optical properties/material composition of some surfaces with resolution approaching nanometer scale. FIG. 1 shows an implementation of AFM-IR in the prior art, operating as a contact mode AFM (FIG. 1A) or a Tapping Mode™ AFM (FIG. 1B). In FIG. 1A, an AFM-IR system 10, includes a probe 20 having a tip 21 that interacts with a sample 16 at a region of interest 17. The dashed lines adjacent the probe cantilever illustrate contact resonance of the probe 20. In operation, an IR source 11 directs an IR beam of electromagnetic energy 12 toward the sample/tip interaction region, typically via a focusing optic 14. The sample will react (due to IR absorption) and the corresponding changes in contact resonance can be detected using an optical deflection detection arrangement. This arrangement includes directing a beam of a laser 22 at the back of the cantilever of the probe so that it bounces toward a detector 24 (quadrant photodiode, for instance). The detected deflection is transmitted to a processor/controller 69 for determination of a contact resonance change, thereby providing an indication of one or more sample properties. FIG. 1B is similar. A Tapping Mode™ AFM-IR system 39 includes a probe 43 having a tip 44 situated substantially a distal end of a lever 46. Probe 43 is driven in to oscillation with a source 56 that energizes a piezoelectric element 48. Changes in oscillation in response to electromagnetic energy 40 directed at the tip-sample interaction zone at a region 42 of interest of the sample are detected using an optical deflection detection apparatus. In particular a laser beam from a laser 50 is directed toward a backside of the probe lever, with the deflected beam 52 being directed to a detector 54 that communicates with a processor/controller 58 to measure the deflection. These AFM-IR prior art systems are known as lower cantilever mode systems (1-3$^{rd}$ mode) operable at less than 1 MHz.

Infrared spectroscopy and scanning probe microscopy (SPM) have been combined to perform a method of spectroscopy that integrates an infrared light source, e.g., a tunable free electron laser, an optical parametric oscillator or a quantum cascade laser with an atomic force microscope (AFM) having a sharp probe that measures the local absorption of infrared light by a sample. Conventional techniques in this regard are often based on contact-mode AFM and extract the absorption signal from contact resonance oscillations that occur when the sample expands (or contracts) during light absorption. Developments have improved the spatial resolution of these photothermal AFM-based techniques from microns to 100 nm. Recently, a tapping mode based AFM technique using IR illumination has been shown to yield a spatial resolution down to 10 nm. Here, the underlying mechanism is claimed to be a photoinduced image force between the AFM probe and the sample.

In general the interaction between a sample under test and electromagnetic energy can be monitored to yield information concerning the sample. In spectroscopy, transmission of light through a sample or its reflection off a sample results in a sample-characteristic plot of transmitted or reflected intensity as a function of wavelength. This spectroscopic information allows users to determine the physical properties of the sample, such as chemical composition or temperature.

Notably, making spectroscopic measurements with a spatial resolution on the nanoscale is continuing to improve. However, despite ongoing progress in the development of imaging techniques with spatial resolution beyond the diffraction limit, simultaneous spectroscopic implementations delivering chemical specificity and sensitivity on the molecular level have remained challenging.

SPMs are facilitating improvements in this area. AFMs are devices which typically employ a probe having a tip and causing the tip to interact with the surface of a sample with appropriate forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample and a corresponding map of the sample can be generated.

Various aspects of the AFM-IR technique are described in U.S. Pat. Nos. 8,869,602, 8,680,457, 8,402,819, 8,001,830, 9,134,341, 8,646,319, 8,242,448, and U.S. patent application Ser. Nos. 13/135,956, 15/348,848, and 62/418,886 by common inventors and commonly owned with this application. These applications are incorporated by reference in their entirety.

In the traditional AFM-IR technique, sample preparation can be a challenge. The technique relies on measuring sample expansion created by absorption of the IR illumination, which induces heating of the sample. Ensuing thermal expansion generates motion in the AFM cantilever which is measured by typical AFM deflection detection techniques. The strength of the signal is dependent on a number of parameters related to the sample and cantilever such as the spring constant of the cantilever, the thermal expansion coefficient of the sample and the penetration depth of the IR illumination. With a sample which has a thick absorbing region, the AFM-IR signal can be strong, but the spatial resolution can degrade due to heat diffusion within the sample leading to non-local (as defined by the size of the AFM tip) sample expansion. By preparing a sample as a thin layer on a non-absorbing or low thermal expansion substrate, the optimum spatial resolution can be achieved. This preparation can be accomplished using a number of different sample preparation techniques, such as drop casting, spin coating, microtomy, etc.

However, some types of samples do not allow usage of these preparation techniques, such as a thin organic coating or layer on a thicker organic substrate. In this type of sample, the IR light can penetrate beyond the thin top layer into the underlying substrate. The IR light will then be absorbed in the substrate which may create further expansion, the total of which is a convolution of the expansion over the full penetration depth of the IR illumination. This can mask the signal from the top layer, rendering the measurement potentially useless.

Moreover, this sample measurement can be especially challenging if the top layer is very thin (less than a few hundred nanometers) and/or has a chemistry which is similar to the substrate. In that case, the resultant signal may be dominated by the contribution from the thicker substrate layer, with only a small modulation contributed by the thinner top layer. As a result, an AFM-IR solution that accommodates distinguishing different compositions between layers of differing thickness (e.g., an organic thin layer and a thicker substrate, such as a thick polymer layer) was desired.

Alternative surface sensitive modes have been developed in U.S. patent application US20190011358A1. While the technique can achieve high surface sensitivity by tracking surface elasticity, the probing depth of the top surface layer is uncontrolled and is not quantifiable. The surface sensitivity is achieved by measuring the shift of probe resonance due to sample surface elasticity change.

The changes in resonant frequency of the AFM cantilever probe result only from the interactions within a short distance of the sample material within a few nanometers or tens of nanometers from the apex of the AFM probe making the technique surface sensitive.

To access subsurface information, ultrasonic force microscopy has been developed to probe subsurface thermal properties with AFM [Tomoda 2003—Applied Physics Letters 82, 622 (2003)]. However, to extend the technique from measuring thermal property to measure optical spectral information is a challenge.

In Tomoda, the researchers used a laser at a wavelength of 850 nm which is not in the region of molecular vibration of the sample. The laser is used to heat up the sample purely as a heat source without obtaining any optical spectroscopic information. In addition, the method requires a transparent cantilever due to direct top illumination (e.g., above the sample) through the cantilever, which works only in the near-infrared but not for mid-infrared region.

AFM based infrared nano spectroscopy techniques (including AFM-IR, PTIR, PiFM, sSNOM, NSOM) are available but they are generally difficult to operate in liquid due to strong light scattering/absorption and strong mechanical damping of the probe. [Light: Science & Applications (2017) 6, e17096] [Nano Lett. 2020, 20, 6, 4497-4504]

These challenges make AFM-IR difficult to study biological and chemical samples in their native aqueous environments rather than in air or another gas.

The strong light scattering and absorption in water especially in the mid-infrared region can overwhelm the signal from the sample.

AFM response gets weaker with the strong mechanical damping of the cantilever oscillations. For example, the Q-factor of the fundamental cantilever mechanical resonance can decrease from ~100 in air to only ~1 in water.

While some of these technical challenges have been addressed with bottom illumination configuration, special sample preparation and transfer mechanism required in bottom illumination is still a limitation.

SUMMARY OF THE INVENTION

In order to address these above-noted drawbacks a new instrument and corresponding method have been developed in the preferred embodiments. The systems and methods described herein may be provided for performing chemical spectroscopy on samples having nanometer-scale thicknesses, with controlled probing depth and volume. The methods can be applied to separate data regarding top surface layer(s) from data related to subsurface properties, with surface sensitivity even on very thick samples. The methods can also be applied to obtain optical and chemical information of buried subsurface features.

Applications that may benefit from the preferred embodiments include measurements of thin surface coatings or films, surface contamination or of composite materials with non-uniform distribution of the materials relative to the depth from the surface.

The new method when applied in liquid environment can significantly reduce signal contribution from liquid even in top or above illumination mode, making it suitable for biological sample study in a native aqueous environment. When operating in contact mode with sample modulation, the new method significantly reduces the damping effect on the probe. In addition, the background due to liquid IR absorption can be subtracted because the contribution from the liquid generates a signal at a different frequency than the contribution from the sample.

In one aspect of the preferred embodiments, a method for obtaining spectroscopic information about a sub-micron region of a sample with a quantitatively controlled probing depth and volume using a scanning probe microscope includes interacting a probe of the scanning probe microscope with a region of the sample. The sample is illuminated with a beam of radiation, and the probe or sample is modulated at a frequency $f_M$. The method includes modulating the beam of radiation at frequency $f_L$ such that a sideband frequency $f_D=|f_L-f_M|$ is substantially equal to a resonance frequency of the probe, including harmonics, and then measuring a probe response at the sideband frequency $f_D$ due to absorption of incident radiation. The response of the probe is analyzed to construct a signal indicative of the absorption spectrum of the sample region. Preferably, at least one of probing depth and probing volume of the signal is controlled by adjusting at least one of $f_L$ and $f_M$.

Definitions

"Optical property" refers to an optical property of a sample, including but not limited to index of refraction, absorption coefficient, reflectivity, transmissivity, transmittance, absorbance, absorptivity, real and/or imaginary components of the index refraction, real and/or imaginary components of the sample dielectric function and/or any property that is mathematically derivable from one or more of these optical properties.

A "scanning probe microscope (SPM)" refers to a microscope where a sharp probe is interacted with a sample surface and then scanning the surface while measuring one or more properties of the sample surface. The scanning probe microscope may be an Atomic Force Microscope (AFM), which may include a cantilever probe with a sharp tip. The SPM generally includes the capability to measure the motion, position and or other response of the probe tip and/or an object to which the probe tip is attached, e.g., a cantilever or a tuning fork or MEMS device, for example. The most common method includes using an optical lever system where a laser beam is bounced off the cantilever probe to measure deflection of the cantilever. Alternatives include self-sensing techniques like piezoresistive cantilevers, tuning forks, capacitive sensing and other techniques.

Other detection systems may measure other properties such as force, force gradient, resonant frequency, temperature and/or other interactions with the surface or responses to the surface interaction.

"Probing depth and volume" refers to the measurement region contributing to the final measurement signal, in the vertical direction from top sample surface for probing depth, and the 3-dimensional volume enclosed underneath the tip for probing volume.

"Interacting a probe with a sample" refers to bringing the probe tip close enough to the surface of a sample such that one or more near field interactions occur, for example the attractive and/or repulsive tip-sample forces, and/or the generation and/or amplification of radiation scattered from an area of the sample in proximity to the probe apex. The interaction can be contact mode, intermittent contact/tapping mode, non-contact mode, pulsed force mode, PeakForce Tapping® (PFT) mode and/or any lateral modulation mode. The interaction can be constant or as in some embodiments, periodic. The periodic interaction may be sinusoidal or any arbitrary periodic waveform. Pulsed force modes and/or fast force curve techniques may also be used to periodically bring the probe to a desired level of interaction with a sample, followed by a hold period, and then a subsequent probe retraction.

"Illuminating" means to direct radiation at an object, for example a surface of a sample, the probe tip, and/or the region of probe-sample interaction. Illumination may include radiation in the infrared wavelength range, visible, and other wavelengths from ultraviolet to THz. Illumination may include any arbitrary configuration of radiation sources, reflecting elements, waveguiding elements such as fibers, focusing elements and any other beam steering or conditioning elements.

"Infrared light source" for the purposes of this specification refers to one or more optical sources that generate or emit radiation in the infrared wavelength range. For example, it can comprise wavelengths within the mid-IR (2-25 microns). An infrared light source may generate radiation over a large portion of these wavelength sub-regions, or have a tuning range that is a subset of one of the wavelength ranges, or may provide emission across multiple discrete wavelength ranges, for example 2.5-4 microns, or 5-13 microns, for example. The radiation source may be one of a large number of sources, including thermal or Globar sources, laser-driven plasma sources, supercontinuum laser sources, frequency combs, difference frequency generators, sum frequency generators, harmonic generators, optical parametric oscillators (OPOs), optical parametric generators (OPGs), quantum cascade lasers (QCLs), nanosecond, picosecond, femtosecond and attosecond laser systems, CO2 lasers, heated cantilever probes or other microscopic heaters, and/or any other source that produces a beam of radiation, either in pulsed or in continuous wave operation. The source may be narrowband, for example with a spectral width of <10 $cm^{-1}$ or <1 $cm^{-1}$ or less, or may be broadband, for example with a spectral width of >10 $cm^{-1}$, >100 $cm^{-1}$ or greater than 500 $cm^{-3}$.

"An electromagnetic wave in the wavelength range of from 200 nm to 300 um covering UV-Vis-IR-THz range" refers to an electromagnetic wave with wavelength range 200 nm-300 um. UV or ultraviolet: 200-380 nm; vis or visible wavelength: 380 nm-700 nm; IR includes near-IR and mid-IR with near-IR: 700 nm-2 μm, mid-IR: 2-25 μm; THz: 25 μm-300 μm.

"Signal indicative of" refers to a signal that is mathematically related to a property of interest. The signal may be an analog signal, a digital signal, and/or one or more numbers stored in a computer or other digital electronics. The signal may be a voltage, a current, or any other signal that may be readily transduced and recorded. The signal may be mathematically identical to the property being measured, for example explicitly an absolute phase signal or an absorption coefficient. It may also be a signal that is mathematically related to one or more properties of interest, for example including linear or other scaling, offsets, inversion, or even complex mathematical manipulations.

"Spectrum" refers to a measurement of one or more properties of a sample as a function of wavelength or equivalently (and more commonly) as a function of wavenumber.

"Infrared absorption spectrum" refers to a spectrum that is proportional to the wavelength dependence of the infrared absorption coefficient, absorbance or similar indication of IR absorption properties of a sample. An example of an infrared absorption spectrum is the absorption measurement produced by a Fourier Transform Infrared spectrometer (FTIR), i.e., an FTIR absorption spectrum. (Note that IR absorption spectra can also easily be derived from transmission spectra.)

"Modulating" or "modulation" when referring to radiation incident on a sample refers to changing the infrared laser intensity at a location periodically. Modulating the light beam intensity can be achieved by means of mechanical chopping of the beam, controlled laser pulsing, and/or deflecting the laser beam, for example by a tilting mirror that is driven electrostatically, electromagnetically, with piezo actuators or other means to tilt or deform the mirror, or high speed rotating mirror devices. Modulation can also be accomplished with devices that provide time varying transmission like acousto-optic modulators, electro-optic modulators, photo-elastic modulators, Pockels cells, and the like. Modulation can also be accomplished with diffraction effects, for example by diffractive MEMS-based modulators, or by high speed shutters, attenuators, or other mechanisms that change the intensity, angle, and/or phase of the laser intensity incident on the sample.

"Demodulate" or "demodulation" refers to extracting an information-bearing signal from an overall signal, usually, but not necessarily at a specific frequency. For example in this application, the collected probe light collected at a photo detector represents an overall signal. The demodulation process picks out the portion that is being perturbed by infrared light absorbed by the sample. Demodulation can be accomplished by a lock-in amplifier, a fast Fourier transform (FFT), a calculation of a discrete Fourier component at a desired frequency, a resonant amplifier, a narrow band bandpass filter, or any other technique that largely enhances the signal of interest while suppressing background and noise signals that are not in sync with the modulation.

"Demodulator" refers to a device or system that performs demodulation.

"Analyzer/controller" refers to a system to facilitate data acquisition and control of the system. The controller may be a single integrated electronic enclosure or may comprise multiple distributed elements. The control elements may provide control for positioning and/or scanning of the probe tip and/or sample. They may also collect data about the probe deflection, motion or other response, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. Memory elements configured to store computer programs, which may execute from memory, may be implemented along with discrete circuit components to carry out one or more of the processes described herein.

A "lock-in amplifier" is one example of a "demodulator" (defined above) and is a device, system, and/or an algorithm that demodulates the response of a system at one of more reference frequencies. Lock-in amplifiers may be electronic assemblies that comprise analog electronics, digital electronics, and combinations of the two. They may also be computational algorithms implemented on digital electronic devices like microprocessors, field programmable gate arrays (FPGAs), digital signal processors, and personal computers. A lock-in amplifier can produce signals indicative of various metrics of an oscillatory system, including amplitude, phase, in phase (X) and quadrature (Y) components or any combination of the above. The lock-in amplifier in this context can also produce such measurements at both the reference frequencies, higher harmonics of the reference frequencies, and/or sideband frequencies of the reference frequencies.

"Optical response" refers to the result of interaction of radiation with a sample. The optical response is related to one or more optical properties defined above. The optical response can be an absorption of radiation, a temperature increase, a thermal expansion, a photo-induced force, the reflection and/or scattering of light, a phase transition, or other response of a material due to the interaction with radiation.

"Sideband frequency" refers to a frequency that is a linear sum or difference of two excitation frequencies. For example, if a system is excited at frequencies $f_L$ and $f_M$, a sideband frequency can be any frequency $f_D$ such that $f_D$ satisfies the relation of $f_D=|m\times f_L+n\times f_M|$, with m and n being positive or negative integers.

BRIEF DESCRIPTION OF THE DRAWINGS

Aspects and advantages of the embodiments provided herein are described with reference to the following detailed description in conjunction with the accompanying drawings.

Throughout the drawings, reference numbers may be re-used to indicate correspondence between referenced elements. The drawings are provided to illustrate example embodiments described herein and are not intended to limit the scope of the disclosure.

FIGS. 2A and 2B are a simplified schematic diagrams of a probing depth sensitive AFM-IR system (2A), according to a preferred embodiment, FIG. 2B showing the system in operation making sample measurements;

FIGS. 10A-10C illustrate the principle of operation of AFM-IR according to the preferred embodiments with probing depth controlled using modulation frequency $f_L$, including IR excitation of a probe-sample and resultant acoustic wave propagation (FIGS. 10A and 10B), and the output signal plotted as a function of depth at different modulation frequencies (FIG. 10C);

FIGS. 11A-11C illustrate improved lateral spatial resolution (data images in FIG. 11A (contact resonance mode) and FIG. 11B (piezo mixing mode), using the depth-controlled technique of the preferred embodiments;

DETAILED DESCRIPTION OF THE PREFERRED EMBODIMENT

Figure 1A:
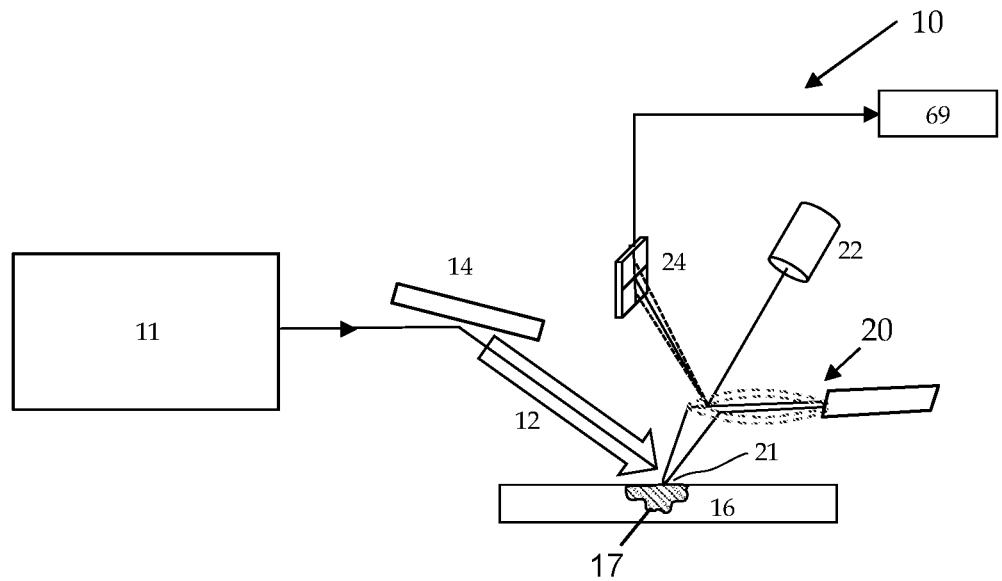
FIGS. 1A and 1B shows a simplified schematic diagram of an AFM-IR system, according to the prior art.
Figure 1B:
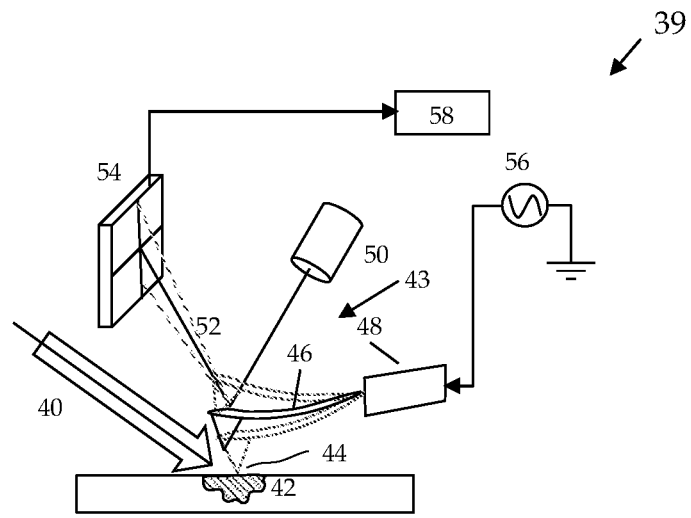

FIG. 2 shows a simplified schematic of an embodiment of the current AFM-IR invention. A light beam 102 is emitted from a light source 100 towards a focusing optic 104 that focuses the beam onto a sample 106 in the vicinity of a probe tip 107 of a cantilever 108 of a probe 109 of a scanning probe microscope. The light beam is modulated at a frequency $f_L$ set by an external controller 112. Light source 100 may be a visible, infrared or, a terahertz source. In one embodiment, the probe tip 107 is engaged on sample 106 in contact mode. A modulation with frequency $f_M$ is provided by the controller 112 to an actuator 110, such as a bimorph piezo attached to the cantilever 108. The sample 106 response to the modulated light beam 102 and piezo modulation is detected via the cantilever response (e.g., deflection) on a position sensitive photo detector 118 using an optical beam bounce technique that directs a beam of a laser 22 toward the probe. The signal output 138 from the detector 118 is analyzed by a demodulator 114, which may be a lock-in amplifier. The demodulator 114 demodulates at a combination frequency $f_D$ of the light modulation frequency $f_L$ 124, and cantilever modulation signal 122 having frequency $f_M$ (i.e., $|m\times f_L+n\times f_M|$, with m and n being positive or negative integers).

Diagram FIG. 2B shows an enlarged view of a scanning probe and sample region similar to that shown in FIG. 2A. An incoming light beam 140 modulated at frequency $f_L$ is incident in the vicinity of the SPM probe tip 144 engaged on sample 142. The cantilever 146 is simultaneously excited by an external modulation source 156 at frequency $f_M$, via an actuator 148, such as by piezo actuation or photothermal or magnetic excitation. Absorption of light beam 140 by sample 142 causes a local thermal expansion and generates a thermal acoustic wave. For a heterogeneous material, the local absorption and thermal acoustic wave source is position dependent and varies in three (3) dimensions. Since the thermal acoustic wave is generated by the incident light, importantly this allows control of the thermal acoustic wave propagation length by changing the modulation frequency $f_L$, thus controlling the region of measurement. Modulation frequency $f_L$ preferably is greater than 0.5 MHz, and more preferably greater than 1 MHz (and even greater than 2 MHz)

The propagation length of the thermal acoustic wave is described by the following equation [Nowaki 1986]:

$$L = \sqrt{\frac{\sigma}{\rho C \pi f}} \quad \text{Eqn. 1}$$

where σ is the thermal conductivity, ρ is the density, C is the heat capacity, and f is the modulation frequency of the thermal wave.

Figure 9:
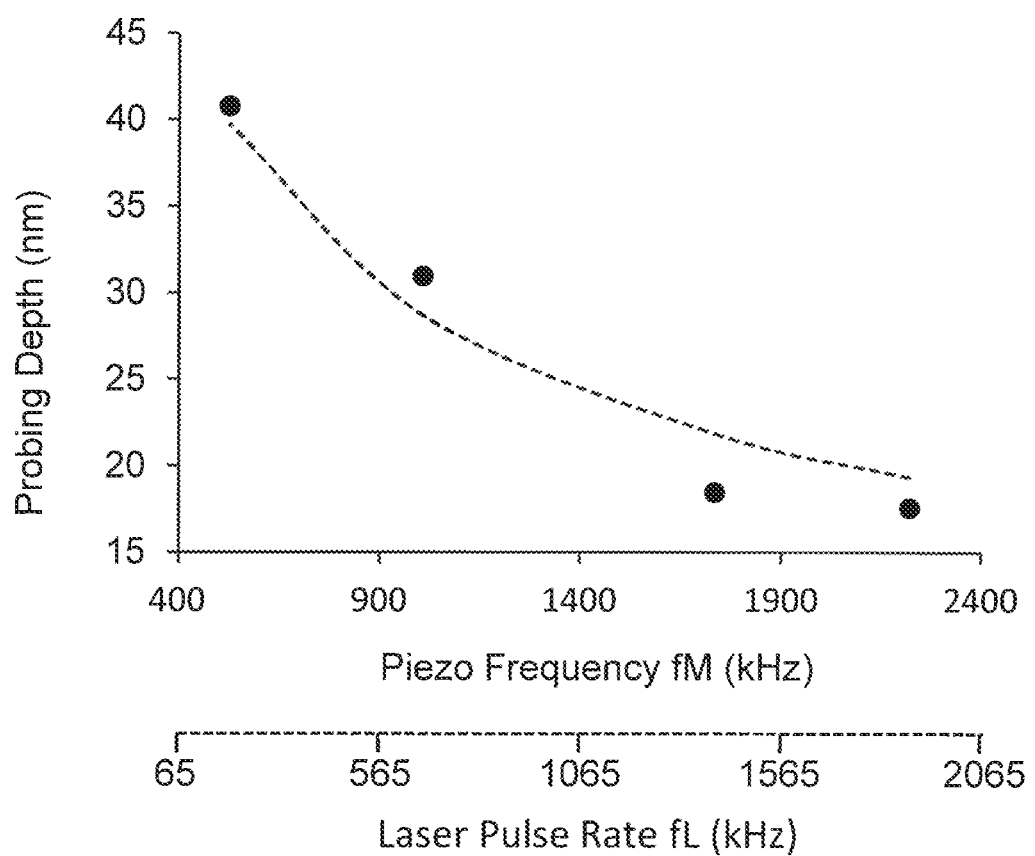
FIG. 9 shows probing depth dependence on laser modulation frequency $f_L$ collected on a wedged sample.

The thermal wave propagation length has a 1/sqrt(f) dependency on the modulation frequency f, thus increasing the laser modulation frequency $f_L$ thus reduces the propagation length which localizes the thermal diffusion in proximity to the surface and confines the IR absorption spectra in this region. Conversely, decreasing the modulation frequency $f_L$ results in larger thermal diffusion length and therefore, yields useful insight about the infrared absorption of the sample at a deeper, controllable location. A map of the chemical species as a function of the sample thickness can be generated by varying the frequencies $f_L$ and $f_M$. Controlling the repetition rate $f_L$ allows control of the depth of penetration of the AFM-IR measurements, as well as the lateral diffusion. As in photothermal spectroscopy the higher frequency IR modulation decreases the thermal wave diffusion length compared to lower frequency modulation], thus makes the lateral resolution better (See FIG. 12) and surface sensitivity higher (see FIG. 9). The depth sensitivity is also dependent on the nature of the sample, since the thermal diffusion length varies with material density, heat capacity and thermal conductivity. As indicated in Eqn. 1, for example, a sample with a higher thermal conductivity would yield deeper probing depth. For a material with well-defined thermal properties, the probing depth can be varied, from greater than 15 nm (>15 nm) to less than 50 nm (<50 nm) from the top surface of the sample by varying the modulation frequencies, as shown in FIG. 9.

The resultant modulation of the deflection beam 152, acquired using an optical beam bounce technique that directs a beam of a laser 150 toward the probe, is measured by the cantilever vertical deflection signal on the photodetector 154. Due to the non-linear nature of probe-sample interaction when the second order of the elastic modulus is considered, a non-linear response of the probe is generated at a mixing or beat frequency $f_D=f_L-f_M$, or more generally $f_D=|m \times f_L + n \times f_M|$ with m and n being positive or negative integers (Piezo Mixing mode).

The nonlinear coupling is also dependent on the magnitude of interaction force between probe and sample. Increasing the interaction force increases the signal at $f_D$. Although the nonlinear coupling factor is not spatially dependent, changing the factor can selectively filter out signal above or below the noise floor.

By demodulation deflection signal 152 at frequency $f_D$, a signal can be constructed that is proportional to the light absorption property of the top surface of sample 142.

Although AFM cantilever probes were used to describe the above embodiment, the surface sensitive technique described above can also be applied to other forms of scanning probes, for example, tuning fork probes, or MEMS devices with sharp probes attached, as long as an interaction between the tip and sample can result in a shift in one or more resonances of the device.

Referring back to FIG. 2A, in one embodiment the light source 100 is modulated at at least one frequency $f_L$ to create a periodic local thermal expansion of the sample 106 upon light absorption. As discussed above, this can result in a modulation of the vertically deflected beam 117 due to the normal force exerted on the cantilever 108 by the local thermal expansion of the sample underneath the probe tip 107. The cantilever 108 is simultaneously excited by an additional modulation (piezo, photothermal or magnetic) source at $f_M$, resulting a combination of beat frequencies due to nonlinear frequency mixing in the region of tip-sample interaction.

In one embodiment, the light source (e.g., 100 in FIG. 2A) and the external modulation source 156 can be separate and controlled independently, i.e., operation could be asynchronous.

In one embodiment, the local thermal expansion force can induce change in the horizontal deflection due to coupling between normal mode and torsional mode of the cantilever vibration. The resultant horizontal deflection signal at $f_L$ can then undergo nonlinear frequency mixing with the external modulation source 156 at $f_M$.

In one embodiment, $f_M$ can be chosen at or close to one of the contact resonance frequencies of the sample. Due to resonance, the effective amplitude at $f_M$ would be much higher compared to non-resonant excitation at similar driving strength, resulting in better sensitivity. The on resonance sensitivity can generally be >50 times of off-resonance sensitivity.

In one embodiment the signal produced by detector 118 is sent to a demodulator 114 that demodulates at a frequency close to the above-mentioned beat frequency $f_D$, such that, $f_D=|m \times f_L + n \times f_M|$ with m and n being positive or negative integers. Since the nonlinear frequency mixing decays rapidly with the relative distance between the SPM tip and the sample surface, observed demodulated signal primarily reflects the light absorption of the sample surface.

In one embodiment, $f_L$ is set to 1.5 MHz or higher in order to reduce the thermal diffusion length within the sample. For an isotropic medium, the thermal diffusion length (L) can be expressed as in Eqn 1. With higher values of $f_L$ value L becomes smaller resulting in higher lateral resolution as well as better surface sensitivity. For example, in FIG. 12. lateral resolution shows a factor of two (2) improvement at 1.5 MHz compare to measurement at 200 kHz.

Referring back to FIG. 2A, light source 100 may be any of a large variety of visible, IR or terahertz light sources as described in the definition of "light source". In one embodiment it is a pulsed infrared laser, for example a narrow-band tunable laser. In one embodiment the IR light source is a pulsed quantum cascade laser (QCL). Alternately it may be a CW infrared laser with an integrated or external modulator. Focusing optic 104 can be a single optical element, for example a lens or a parabolic mirror or may be a system of optical components including an arbitrary number of lenses and/or mirrors, diffractive components, etc. to deliver focused light beam to the sample 106 in the vicinity of the SPM probe tip 107.

Figure 3:
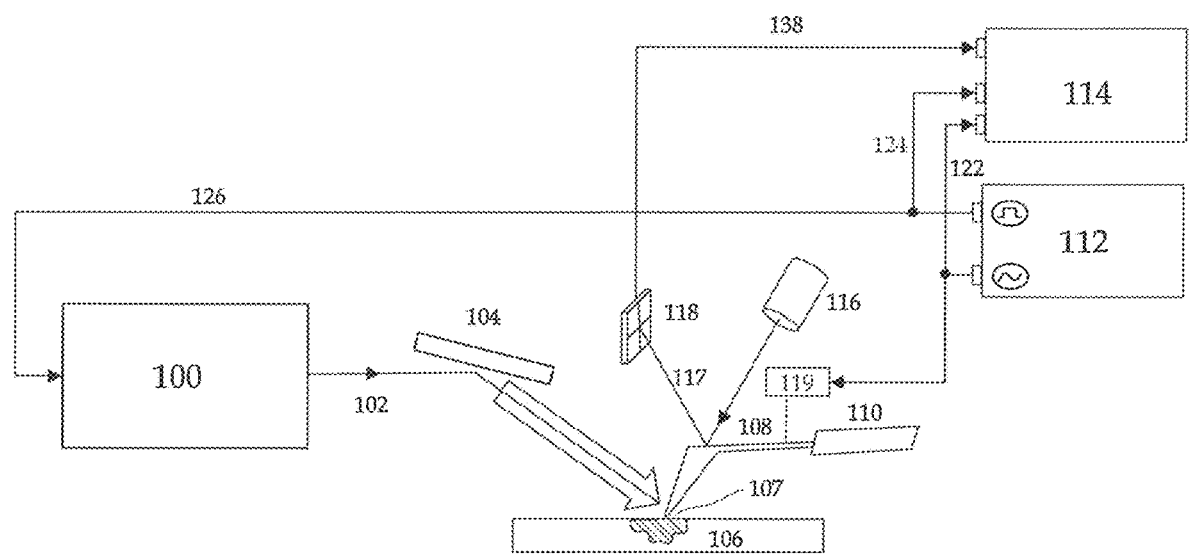
FIG. 3 shows an alternative implementation of a depth sensitive AFM-IR system according to another embodiment, with an alternative method of probe modulation without using piezoelectric component.

FIG. 3 illustrates an alternative cantilever 108 modulation scheme, where the cantilever can be modulated by a photothermal or magnetic excitation source 119 driven by cantilever or probe modulation signal 122. In photothermal cantilever excitation, an additional light source (UV, VIS or nIR) is focused on the base of a cantilever 108 resulting in thermal excitation at the cantilever's characteristic resonance frequencies. When the intensity of the beam is modulated at a frequency ($f_M$) close to one of the cantilever resonances, it can be efficiently driven without interference from other mechanical resonances.

In one embodiment, $f_D$ is set at or close to one of the contact resonance frequencies of the sample by carefully choosing $f_L$, $f_M$, m and n. At contact resonance, the amplitude of the demodulated signal is maximum, resulting in better sensitivity compared to the non-resonant condition.

Figure 4:
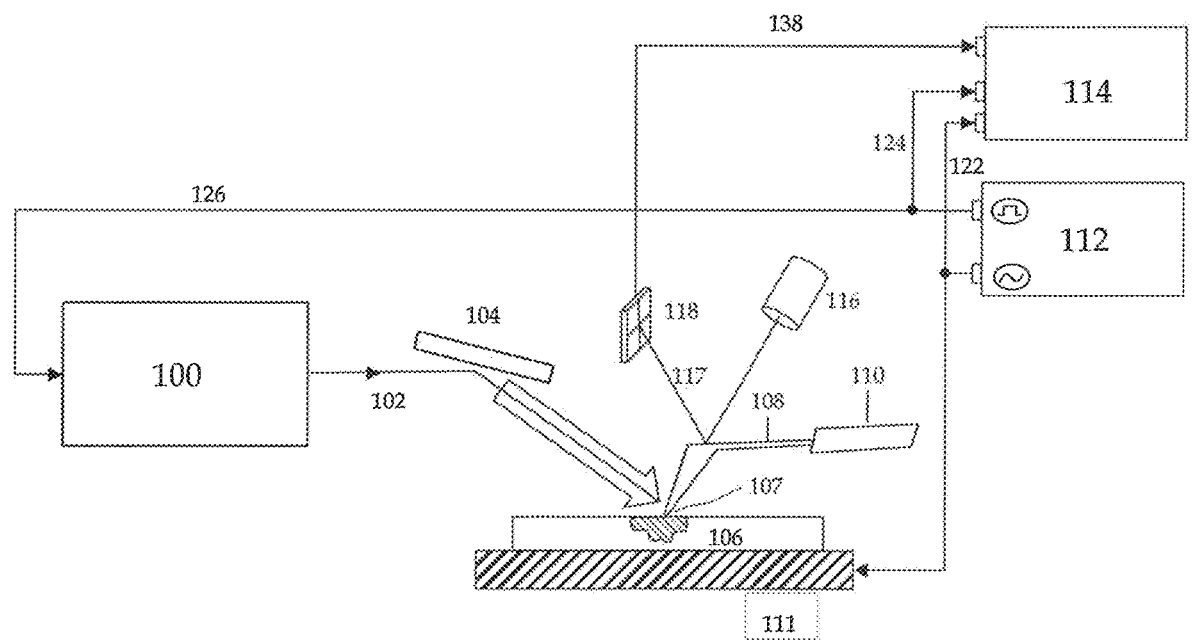
FIG. 4 shows yet another alternative implementation of a depth sensitive AFM-IR system, in this case using sample modulation.

FIG. 4 illustrates another alternative modulation scheme that involves attaching an additional piezoelectric scanner 111 to the sample 106. Instead of modulating the probe at $f_M$, this alternative modulation scheme displaces the sample in a vertical direction at $f_M$ via operation of the scanner 111. This implementation offers the advantage of removing the restriction of $f_M$ being close to a probe resonance in the case of probe modulation. In one embodiment, the sample modulation can be applied through a general acoustic modulator other than a piezo.

Figure 5:
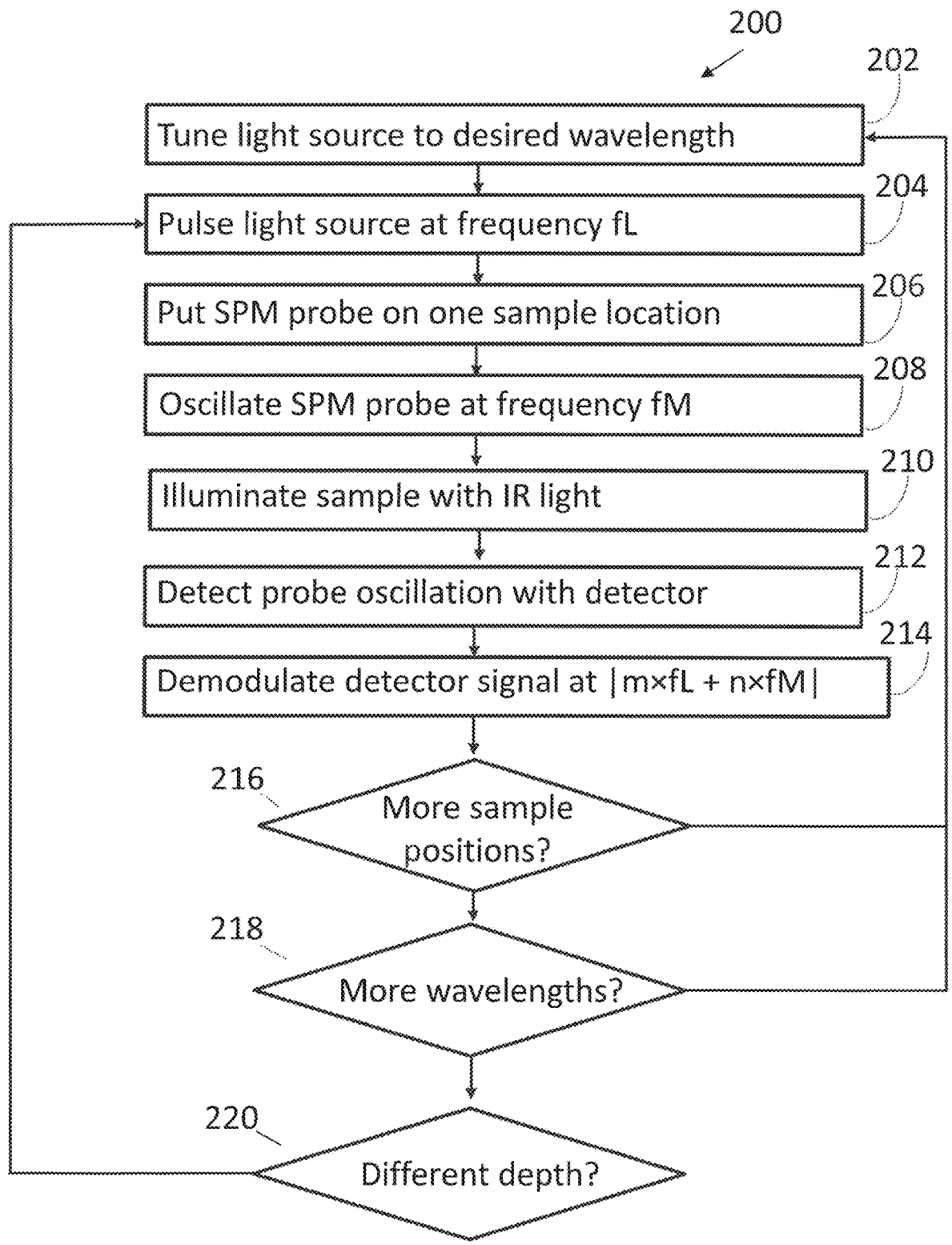
FIG. 5 is a flow chart of an AFM-IR method, according to an illustrative embodiment.

FIG. 5 shows a flow chart of an illustrative method 200. In step 202, a light source is tuned to a desired wavelength. Typically, a wavenumber matching a chemical resonance of the sample. The wavelength range in practice of 800 cm$^{-1}$-4000 cm$^{-1}$ is limited by currently available lasers. In step 204, the light source is pulsed at a frequency $f_L$. Note that this may be achieved by an internal pulse controller or an external chopper. In step 206 an SPM probe is engaged at a sample location. Note that this may be achieved by moving the tip or the sample or a combination of both. In step 208, the SPM probe tip is modulated at a frequency $f_M$. Then in 210, the light is used to illuminate a region of the sample in the vicinity of the SPM probe tip. In step 212, the probe oscillation signal is detected by the position sensitive photo detector and the detected signal is then demodulated to construct a signal at a frequency |m×$f_L$+n×$f_M$| with m and n negative or positive integers (step 214). This measurement can be repeated at any number of different positions on the sample (step 216) and/or wavelengths (step 218). This measurement can also be repeated at different frequencies $f_L$ (step 220, back to step 204) to achieve measurement at different probing depth.

Figure 6A:
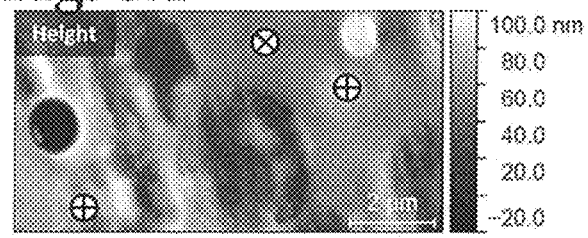
FIGS. 6A-6C shows measurement data with mixed spectrum from top surface and subsurface using prior art traditional AFM-IR technique, with the IR signal plotted as a function of wavenumber.
Figure 6B:
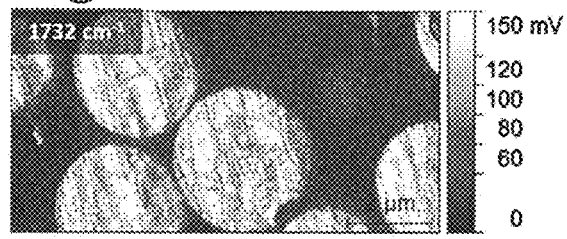
Figure 6C:
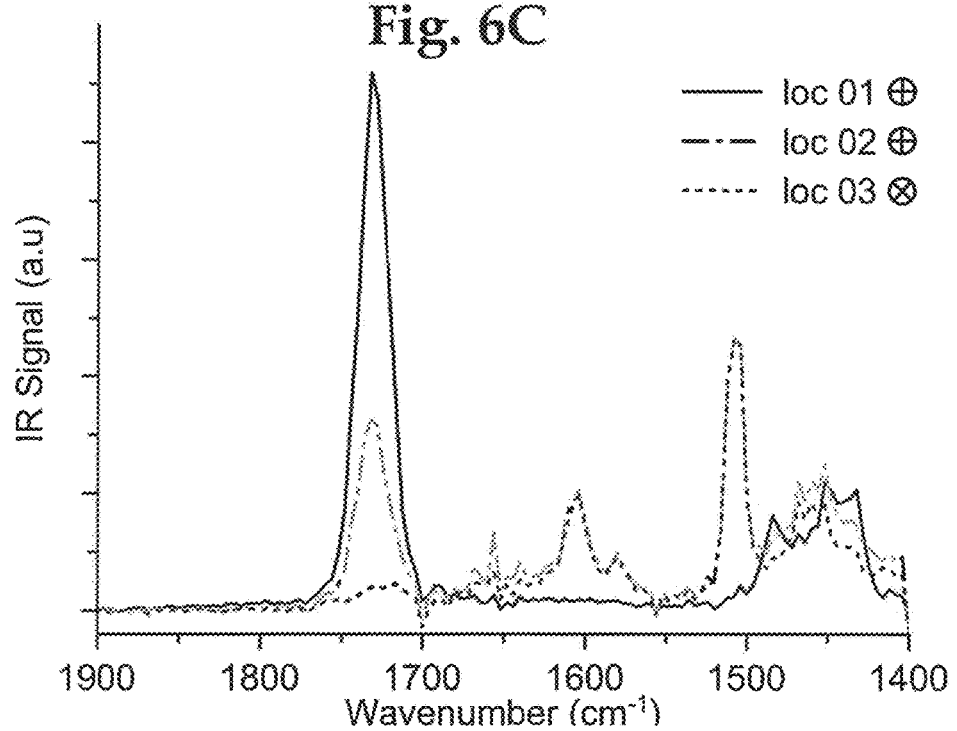

FIG. 6 shows an example of subsurface contamination problem of the prior art measurements. The sample under measurement is a film of polymer mixture about 300 nm thick consisting of PMMA embedded in epoxy. The spatial distribution of polymer components is shown in AFM height map (FIG. 6A) and contact-mode AFM-IR image (FIG. 6B) at 1732 cm$^{-1}$. The bright spherical areas in FIG. 6B is PMMA, because PMMA absorption at 1732 cm$^{-1}$ yields a higher signal than the surrounding epoxy. AFM-IR spectrum (FIG. 6C) is obtained at locations 1, 2 and 3, with location 1 on PMMA, location 3 on epoxy. Spectrum at location 1 corresponds to a PMMA IR absorption spectrum, spectrum at location 3 corresponds to an epoxy IR absorption spectrum. For location 2, the top layer is epoxy but with PMMA embedded underneath, the resulting spectrum collected on location 2 is a superposition of spectrum 1 and spectrum 3 due to contributions from both the top layer epoxy (peak at 1510 cm$^{-1}$ and 1602 cm$^{-1}$) and the subsurface PMMA (peak at 1732 cm$^{-1}$).

Figure 7A:
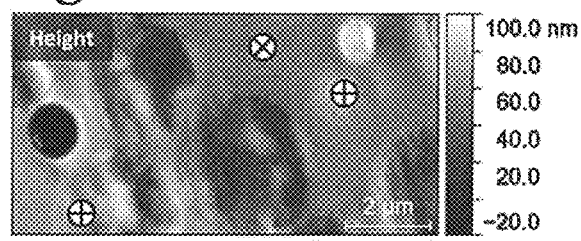
FIGS. 7A-7C shows surface sensitive measurement data with the contribution from the subsurface removed using the preferred embodiments, with the IR signal plotted as a function of wavenumber.
Figure 7B:
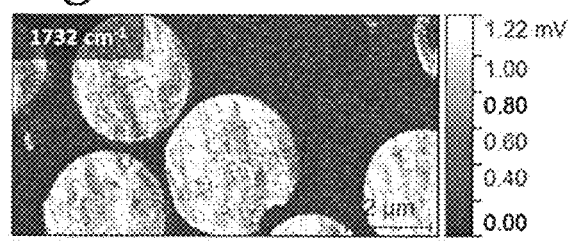
Figure 7C:
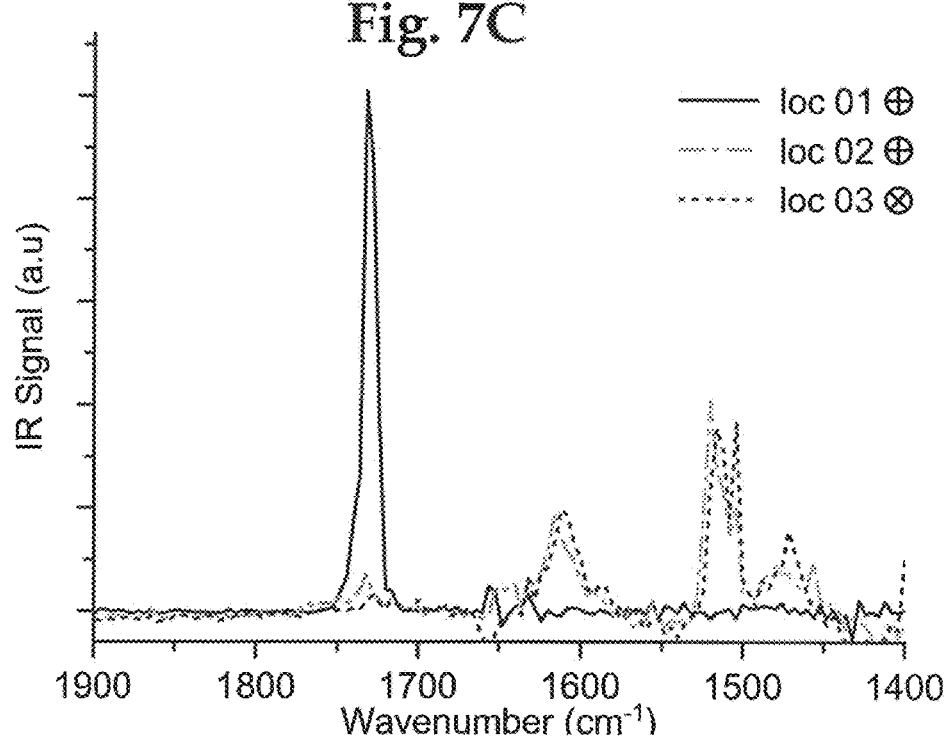

In comparison, FIGS. 7A-7C shows images (7A and 7B) and spectrum (7C) of the same sample obtained with the present modulation system/method. Now for spectrum at location 2, the 1732 cm$^{-1}$ peak of PMMA absorption is absent. Instead, it almost completely matches the epoxy spectrum on location 3 within the noise floor. This indicates that the subsurface contribution of PMMA absorption is removed from the signal with contribution only from the top layer.

Figure 8A:
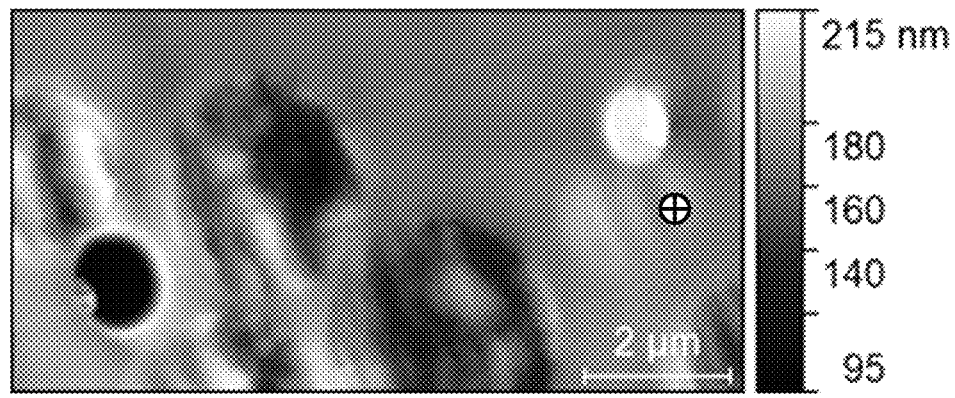
FIGS. 8A and 8B show different ratio of top surface versus subsurface spectral feature at different laser modulation frequencies $f_L$ when using the preferred embodiments, with a resultant image (FIG. 8A) and the IR signal plotted as a function of wavenumber (FIG. 8B)
Figure 8B:
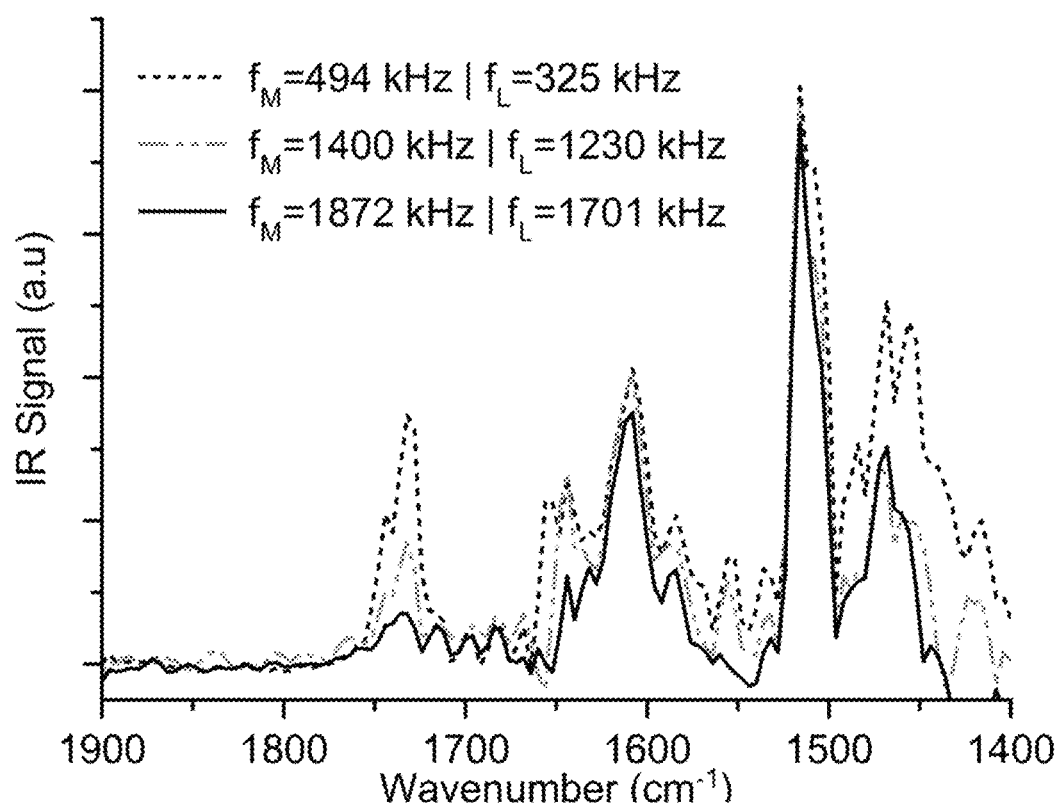

To further explore the depth control sensitivity with laser modulation frequency $f_L$, FIG. 8B shows three (3) spectra taken at a certain location at different frequency $f_L$. Increasing $f_L$ from 325 kHz to 1701 kHz, the signal at 1732 cm$^{-1}$ due to the PMMA absorption gets weaker, indicating a smaller and more confined probing depth close to the top surface (image shown in FIG. 8A).

FIG. 9. shows the controlled depth sensitivity as a function of modulation frequencies $f_L$. This probing depth versus frequency calibration is measured on a wedged PMMA sample with known thickness. The dots are experimental result, and the dashed line is a 1/sqrt($f_L$) fitting as predicated by Eqn 1. Note, even though formula in Eqn. 1 is derived for plane heating wave, the frequency dependence of the propagation length remains as 1/sqrt(f) for general geometries, but with different coefficients. For real experimental geometry, the laser generated heat source geometry is expected to be similar to a spherical shape. The formula in Eqn. 1 can be used as a rough estimation to estimate probing depth. For example, for PMMA at frequency of 1.4 MHz, the thermal wave propagation length L equals 165 nm according Eqn. 1.

Experimental data shows <30 nm deep top surface confinement can be achieved at frequency $f_L$=2 MHz for a PMMA sample.

Figure 10C:
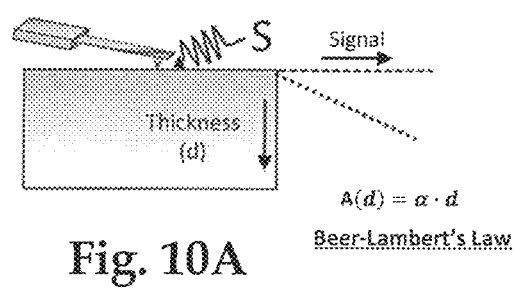
Figure 10C:
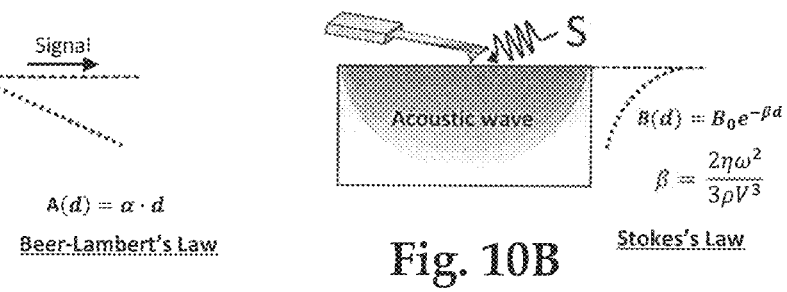
Figure 10C:
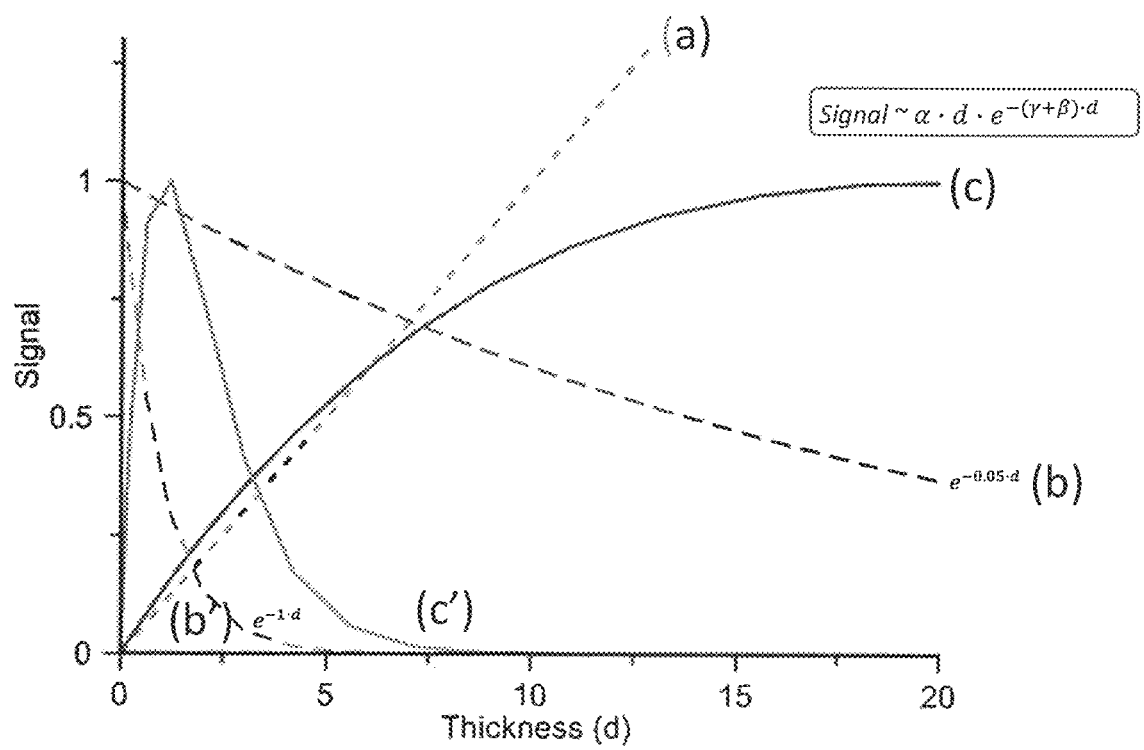

FIGS. 10A-C illustrate the principle of the new modulation method. FIG. 10A shows a schematic view of a probe interacting with a sample, with an excitation source "S" directed at a sample location/region of interest. In general, the amount of IR radiation is governed by Beer-Lambert's law, where sample absorption scales linearly with thickness, as shown in FIG. 10A. After the sample absorbs pulsed IR radiation, the resulting photothermal acoustic wave propagates through the sample governed by Stoke's law, as shown in FIG. 10B, $$A(d) = \alpha \cdot d \quad \text{(Beer-Lambert's Law)} \quad \text{Eqn. 2a}$$

$$B(d) = B_0 e^{-\beta d} \quad \text{(Stokes Law)} \quad \text{Eqn. 2b}$$

$$\beta = \frac{2\eta\omega^2}{3\rho V^3}$$

Here α is the absorption coefficient, d is probing distance or sample thickness, A(d) is sample absorbance at probing distance d; B(d) is the acoustic signal intensity at distance d, $B_0$ is acoustic signal intensity at the sample surface (d=0), β is a compound parameter consisting of the following: η: sample viscosity, ω: modulation frequency, ρ: density and V: velocity of acoustic wave in the medium. Variation of signal intensity with thickness is modeled based on Eqn. 2a is shown as trace (a) in FIG. 10C. Similarly, Stoke's law model (Eqn. 2b) is illustrated as trace (b) and (b') with different modulation frequencies ($\omega_b < \omega_b'$). When the tip interacts with the sample, theaforementioned non-linear tip-sample interaction force also varies with the distance (d) from the top surface. Assuming an exponential dependency of the nonlinear coupling coefficient (γ) with thickness, the overall signal can be expressed as, $$\text{Signal} \sim \alpha \cdot d \cdot e^{-(\beta+\gamma) \cdot d} \qquad \text{Eqn 3.}$$

Based on this model, when we increase the modulation frequency, the probing depth decreases and vice versa, as shown by the solid curves (c) and (c') ($\omega_c < \omega_{c'}$) in FIG. 10C.

The confinement of probing volume not only varies in the vertical direction with frequency, but also in the lateral direction. This can be seen comparing FIG. 6C with FIG. 7C, FIG. 7C shows sharper resolution around the PMMA boundary. FIG. 11 shows a line profile across a PMMA and epoxy boundary obtained from FIG. 6C and FIG. 7C. Indeed, solid line from FIG. 7C using new modulation has a higher resolution (FIG. 11B) than the dashed line from FIG. 6C using traditional contact resonance mode AFM-IR (image in 11A at 1732 cm$^{-1}$).

Figure 12:
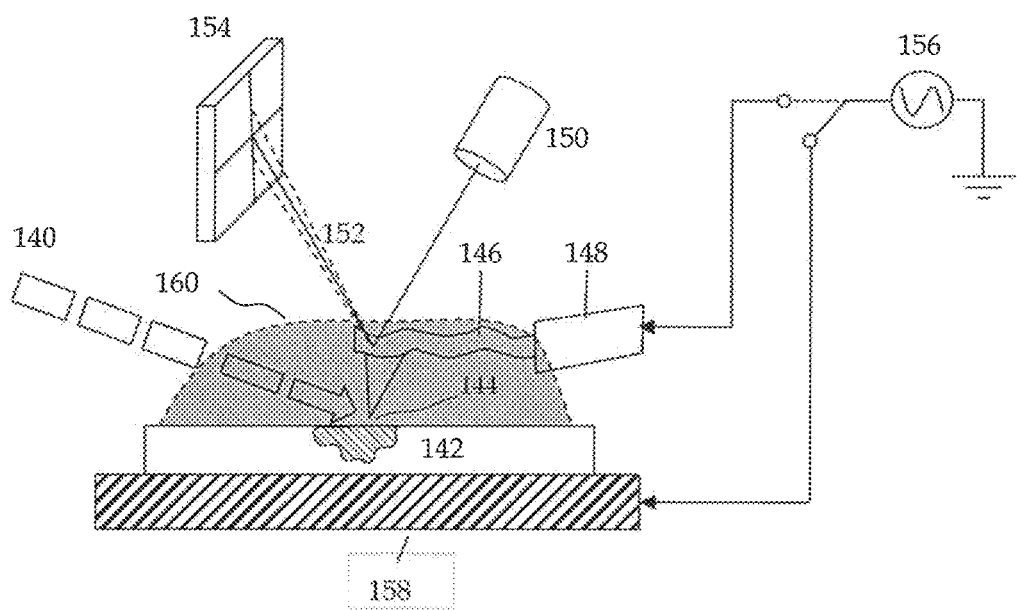
FIG. 12 is a schematic illustration of an AFM-IR system of the preferred embodiments, adapted for in-liquid measurements.
Figure 13:
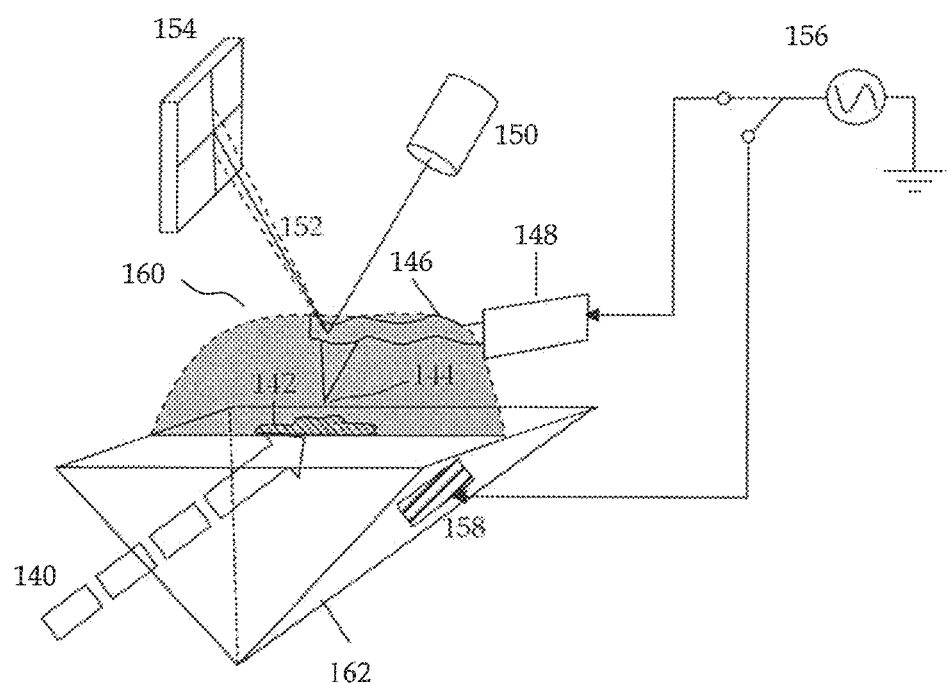
FIG. 13 is a schematic illustration of an AFM-IR system of the preferred embodiments, adapted for in-liquid measurements, using bottom-up IR illumination.

FIG. 12 and FIG. 13 show implementation of the basic technique described herein for in-liquid measurement.

These figures represent the two different configurations of illumination for in-liquid measurement, using a piezo electric scanner 158 (sample or probe may be modulated using switched source 156). In the first case (FIG. 12—reference numerals correspond to FIG. 2B) the IR beam 140 comes from the top and propagates through a water meniscus 160 before reaching the sample 142. In the second case (FIG. 13) the illumination is done in total reflection (like ATR) using a prism 162 transparent in the mid-IR range, with scanner 158 coupled thereto. This last configuration is more restrictive as the sample must be deposited on the top of the prism surface. In this case, one has to consider the prism material and size because the prism sometimes is not compatible with the sample preparation. For the configuration in FIG. 12 the sample can be mounted on a substrate that is not transparent in IR range because the light does not have to pass therethrough.

The operation to make the piezo-mixing measurement (Piezo Mixing Mode) is the same as in air. The light 140 induces a photothermal-acoustic wave at the repetition rate of the laser and the piezo 158 modulates the sample surface 142. As the environment is liquid, the photothermal effect will induce an acoustic wave from the water surrounding the tip (when the wavelength corresponds to its absorption band), with either configuration (FIGS. 12 and 13). The acoustic wave will propagate in the full liquid volume and will hit the cantilever 146. The frequency of the acoustic wave is directly associated to the repetition rate of the laser. As in the piezo mixing technique, we tune the frequency of the laser and the piezo away from a contact resonance of the cantilever, as a result, the acoustic wave from water will be not detected by the cantilever. With, the same idea the piezo modulation will create a water acoustic wave propagating in the full volume at the frequency of the piezo modulation. Again this frequency will be different from the resonance of the cantilever.

As in air environment, considering the non-linear nature of probe-sample interaction when the second order of the elastic modulus of the sample is considered, a non-linear response of the probe is generated at a mixing frequency $f_D = f_L - f_M$, or more generally $f_D = |m \times f_L + n \times f_M|$ with m and n being positive or negative integers. In this case, the non-linear interaction will exist only if the material gives a consequent non-linear response of elasticity, which is true for solid material but not for the liquid. The second order of elastic modulus of the water is considered negligible (even null) in comparison. In these conditions, the non-linear response will come only from the sample and not from the water environment surrounding the AFM tip. The non-linear interaction acts like a filter that removes the water absorption contribution from the liquid environment in which the sample resides.

Note if the sample contains water internally (like a cell sample), the water absorption inside the sample will still induce a photothermal effect that will contribute to the final thermal expansion of the sample.

The piezo mixing (Piezo Mixing mode) is then a good technique to remove the water absorption contribution in IR range opening cellular biology experiments in IR with nanoscale resolution.

A calibration procedure can be applied to samples to estimate the depth penetration of AFM-IR in nanometers. For example, by taking measurements on a known sample with certain mechanical and thermal properties, the probing depth at different frequencies can be quantified with a sample height calibration. By applying the information to a new sample with prior knowledge of mechanical property and thermal property but unknown optical property, the probing depth can be calibrated on the new unknown sample.

For probe modulation with $f_M$ exciting the probe, there is a limitation of only about five (5) discrete frequencies close to the probe cantilever resonance frequency that are accessible. However, with $f_M$ modulation applied through the sample, a continuous frequency repetition rate can be used, which is not limited to the probe resonance frequency. This enables measurement at any arbitrary frequency $f_L$. Obtaining measurements at a continuous tuning of $f_L$, one can perform IR mapping at different frequencies. Using a suitable mathematical program, it is possible to retrieve the absorption image as a function of depth.

Due to the non-linear nature of probe-sample interaction when the second order of the elastic modulus is considered, a non-linear response of the probe is generated at a mixing or beat frequency $f_D = f_L - f_M$, or more generally $f_D = |m \times f_L + n \times f_M|$ with m and n being positive or negative integers (Piezo Mixing mode).

The nonlinear probe-sample interaction can be modulated by the sample expansion and probe vibration. The coupling coefficient of probe-sample interaction can also be controlled by the stress of the probe asserted on the sample.

Increasing the stress applied on the sample from the probe increases the signal at $f_D$.

Although certain embodiments contemplated by the inventors of carrying out the present invention are disclosed above, practice of the present invention is not limited thereto. It will be manifest that various additions, modifications and rearrangements of the features of the present invention may be made without deviating from the spirit and scope of the underlying inventive concept.

We claim:

1. A method for obtaining spectroscopic information about a sub-micron region of a sample with a quantitatively controlled probing depth and volume using a scanning probe microscope, the method comprising the steps of:
   interacting a probe of the scanning probe microscope with a region of the sample;
   illuminating the sample with a beam of radiation;
   modulating the probe or the sample at a frequency $f_M$;
   modulating the radiation beam at frequency $f_L$ such that a sideband frequency $f_D = |f_L - f_M|$ is substantially equal to a resonance frequency of the probe;

measuring a probe response at the sideband frequency $f_D$ due to absorption of incident radiation;

analyzing a response of the probe to construct a signal indicative of the absorption spectrum of the sample region;

controlling at least one of probing depth from a top surface of the sample and probing volume of the signal by adjusting at least one of $f_L$ and $f_M$; and wherein the modulation frequency $f_M$ is applied to the sample independent of any probe resonance frequency of the probe.

2. The method of claim 1, further comprising adjusting at least one of a) the radiation beam modulation frequency $f_L$ while accordingly adjusting $f_M$ to maintain $f_D$ at a probe resonance frequency and b) an interaction force between the probe and the sample.

3. The method of claim 2, wherein the interaction force is adjusted by varying the amplitude of modulation at frequency $f_M$.

4. The method of claim 2, wherein the interaction force is adjusted by controlling a static force or stress applied to the probe or the sample.

5. The method of claim 2, wherein the scanning probe microscope operates in at least one of contact, intermittent contact, tapping or noncontact mode.

6. The method of claim 2, wherein the sample and the probe is one in a liquid environment.

7. The method of claim 6, wherein contributions to the signal from the liquid environment are substantially suppressed as a result of the adjusting step.

8. The method of claim 1, wherein the modulation frequency $f_M$ is applied to the probe and is substantially equal to a contact or free air resonance of the probe so as to increase the signal.

9. The method of claim 1, wherein the sideband frequency $f_D=|m \times f_L+n \times f_M|$, with m and n being positive or negative integers.

10. The method of claim 1, wherein the radiation beam modulation frequency $f_L$ is greater than 0.5 MHz.

11. The method of claim 1, wherein the radiation beam modulation frequency $f_L$ is greater than 1 MHz.

12. The method of claim 1, wherein the radiation beam modulation frequency $f_L$ is greater than 2 MHz.

13. The method of claim 1, wherein the probing depth is less than 100 nm from the top surface of the sample.

14. The method of claim 1, wherein the probing depth is less than 50 nm from the top surface of the sample.

15. The method of claim 1, wherein the probing depth is less than 30 nm from the top surface of the sample.

16. The method of claim 1, wherein the beam of radiation is an electromagnetic wave in a wavelength range of about 200 nm to 300 μm covering UV-Vis-IR-THz range.

17. The method of claim 1, where the signal indicative of the absorption spectrum is measured at a plurality of frequencies to calibrate the probing depth.

18. The method of claim 17, wherein the measurement at a plurality of frequencies is used to separate a top surface layer property from a subsurface property of the sample.

19. The method of claim 17, wherein the measurement at a plurality of frequencies is used to measure embedded subsurface properties of the sample.

20. A method for obtaining spectroscopic information about a sub-micron region of a sample in liquid environment using a scanning probe microscope, the method comprising the steps of:

interacting a probe of the scanning probe microscope with a region of the sample;

illuminating the sample with a beam of radiation;

modulating probe or the sample at a frequency $f_M$;

modulating the beam of radiation at frequency $f_L$ such that a sideband frequency $f_D=|f_L-f_M|$ is substantially equal to a resonance of the probe;

measuring a probe response at the sideband frequency $f_D$ due to absorption of incident radiation;

controlling at least one of probing depth from a surface of the sample and probing volume of the signal by adjusting at least one of $f_L$ and $f_M$; and constructing a signal indicative of the optical property of the sample wherein contributions to the signal from the liquid environment are substantially suppressed.

21. The method of claim 20, further comprising adjusting at least one of a) the radiation beam modulation frequency $f_L$ while accordingly adjusting $f_M$ to maintain $f_D$ at a probe resonance frequency and b) an interaction force between the probe and the sample.

22. The method of claim 20, wherein the beam of radiation comes from either above or below the sample.

23. The method of claim 20, wherein the beam of radiation comes from above the sample without a prism.

24. The method of claim 20, wherein the sample and the probe are completely immersed in liquid without a special liquid cell.

25. An apparatus for obtaining spectroscopic information about a sub-micron region of a sample with a quantitatively controlled probing depth and volume comprising:

a scanning probe microscope with a probe;

a radiation source;

a radiation source modulator;

a probe response detector, and wherein the apparatus is configured to:

illuminate the sample with a beam of radiation at a plurality of radiation wavelengths from at least one radiation source, modulate the probe close to a probe contact resonance frequency, $f_M$, modulates the light beam at at least one frequency $f_L$, measure a response of the probe at at least one sideband frequency $f_D$ due to absorption of incident radiation, automatically adjust at least one of modulation frequency $f_M$ or $f_L$, and analyze the response of the probe to construct a signal indicative of the absorption spectrum of the sample region, and wherein the modulation frequency $f_M$ is applied independent of any probe resonance frequency of the probe.

26. The apparatus of claim 25, wherein the system further adjusts the radiation beam modulation frequency $f_L$ to control at least one of probing depth from a top surface of the sample and a volume of the signal indicative of the absorption spectrum.

* * * * *